United States Patent [19]

Leo

[11] Patent Number: 4,600,649
[45] Date of Patent: Jul. 15, 1986

[54] ABRASION-RESISTANT ULTRAVIOLET-CURABLE COATINGS

[75] Inventor: A. Frank Leo, Palatine, Ill.

[73] Assignee: DeSoto, Inc., Des Plaines, Ill.

[21] Appl. No.: 663,569

[22] Filed: Oct. 22, 1984

[51] Int. Cl.$^4$ .............................................. B05D 1/36
[52] U.S. Cl. ..................................... 428/412; 428/447;
428/518; 427/54.1; 522/33; 522/92; 522/95;
522/120; 522/122
[58] Field of Search ...................... 204/159.13, 159.16,
204/159.22, 159.23; 428/447, 412, 518;
427/54.1

[56] References Cited

U.S. PATENT DOCUMENTS

| | | | |
|---|---|---|---|
| 4,284,707 | 8/1981 | Nagasawa et al. | 204/159.16 |
| 4,317,862 | 3/1982 | Honda et al. | 204/159.16 |
| 4,451,568 | 5/1984 | Schneider et al. | 204/159.22 |
| 4,468,489 | 12/1984 | George | 204/159.22 |

*Primary Examiner*—Melvyn I. Marquis
*Attorney, Agent, or Firm*—Dressler, Goldsmith, Shore, Sutker & Milnamow, Ltd.

[57] ABSTRACT

Ultraviolet-curable, liquid coating compositions are disclosed which are resistant to abrasion and which are strongly adherent to basic plastic surfaces. These compositions comprise one or more polyacrylates or polymethacrylates, preferably including from 70% to 85% of trimethylol propane triacrylate, from 5% to 15% of a carboxylic acid which contains acrylic or methacrylic unsaturation, preferably acrylic acid itself, and photoinitiators (which are preferably ketonic and which desirably comprise a substituted acetophenone and benzophenone) are used to render the composition sensitive to ultraviolet light. The polyacrylate component preferably includes from 1% to 12% of a diacrylate or dimethacrylate of a diglycidyl ether of a bisphenol in which the molecular weight of the diglycidyl ether is less than about 600. The above proportions are based on the total weight of polymerizable material. The composition preferably also includes 0.5% to 2.5% of a silicone dicarbinol diurethane diacrylate in which the carbinol groups are carried by an alkoxylate, preferably an ethoxylate, constituting from 30% to 70% of the silicone dicarbinol.

20 Claims, No Drawings

ABRASION-RESISTANT ULTRAVIOLET-CURABLE COATINGS

TECHNICAL FIELD

This invention relates to ultraviolet-curable coating compositions which will, when cured, resist abrasion and be strongly adherent to plastic surfaces which possess a basic nature. These surfaces are illustrated by polycarbonate resins and plasticized polyvinyl chloride resins, both of which are in common use.

BACKGROUND ART

Ultraviolet-curable coating compositions are receiving greater attention in industry because they cure rapidly with a minimum of volatiles being expelled as the liquid coating composition converts to a solid solvent-resistant film. Such compositions frequently include one or more polyacrylates in combination with one or more photoinitiators and/or photosensitizers to enable the polyacrylates to respond to the ultraviolet radiation which induces cure. Two common defects of such coatings have been poor adhesion of the cured coatings to the substrate and poor abrasion resistance. Adhesion is especially poor when the substrate is a plastic possessing a basic surface, as is found in polycarbonate resins and ester-plasticized polyvinyl chloride resins. These resins are frequently used to provide molded products.

As a matter of interest, the basic nature of these plastic surfaces is set forth by F. W. Fowkes in "Acid-base Interactions in Polymer Adhesion", see the text "Physicochemical Aspects of Polymeric Surfaces" Vol. 2, Edited by K. L. Mittal, Plenum Press, N. Y. pages 583–603. The plastic surfaces having a basic nature are normally provided by the presence in the plastic of unpaired pairs of electrons as is provided by ester, ether, amino and oxirane groups. The resins of particular interest in this invention are those containing the carbonyl group, as is provided by the ester group.

It is desired to coat these basic-surfaced plastic moldings to improve their solvent resistance, and to do so with ultraviolet-curable coatings, but this has not been simple because of the poor adhesion and poor abrasion resistance which characterize such coatings.

DESCRIPTION OF INVENTION

In accordance with this invention, a radiation curable, liquid coating composition comprises one or more polyacrylates or methacrylates, (these terms identifying esters of acrylic and methacrylic acids respectively) especially those which cure to form relatively hard coatings because they include from 70% to 85% of a polyacrylate or polymethacrylate of a polyhydric alcohol containing at least about 2.4 acrylate or methacrylate groups per molecule, or an ethoxylate or propoxylate thereof containing not more than about 1.0 ethyleneoxy or propyleneoxy groups per molecule, especially trimethylol propane triacrylate, from 5% to 15% of a carboxylic acid which contains acrylic or methacrylic unsaturation, especially acrylic acid itself, and photoinitiators which render the composition sensitive to ultraviolet light.

It is preferred to also include in the polyacrylate or polymethacrylate component from 1% to 12%, preferably 3% to 7%, of an epoxy diacrylate or dimethacrylate, especially of a diglycidyl ether of a bisphenol having a molecular weight less than about 600.

As will be well understood in the art, the acrylates are faster curing than the methacrylates, and are preferred.

The photoinitiators are preferably ketonic photoinitiators and most preferably comprise benzophenone so that the ultraviolet cure can be carried out in air instead of in a nitrogen or other inert atmosphere.

The proportions specified above and throughout this document, including its claims, are by weight, unless otherwise specified. The above proportions are based on the total weight of polymerizable material.

In the preferred practice of this invention, especially hard coatings are provided using a polyacrylate or polymethacrylate containing at least about 2.4 unsaturated groups per molecule, especially a trimethylol propane triacrylate which may be either fully or almost fully triacrylated. The acrylation of trimethylol propane is not usually complete, and as a practical matter it is convenient to use a trimethylol propane which has been acrylated to provide an average of about 2.8 acrylate groups per molecule. However, as little as about 2.4 acrylate groups per molecule will allow the production of reasonably hard coatings, and the term trimethylol propane triacrylate will be understood as embracing such a material. The most available trimethylol propane triacrylates are those containing from 2.4 to 2.8 acrylate groups per molecule, and these are preferred for that reason. The importance of selecting trimethylol propane triacrylate or another similar polyacrylate or methacrylate in the preferred practice of this invention will be evident from the large proportion of its use herein in the formation of hard coatings. While other factors to be discussed can enhance the hardness and abrasion resistance, trimethylol propane triacrylate not only produces very hard coatings, but it also lowers the viscosity of the composition which is helpful to coating application, and it is rapidly curable with ultraviolet light.

While trimethylol propane triacrylate is preferred, the useful polyacrylates and polymethacrylates containing at least about 2.4 unsaturated groups per molecule are further illustrated by glycerin triacrylate or pentaerythritol triacrylate or tetraacrylate. Less desirably, one can use the corresponding methacrylates.

The small proportion of diacrylate or dimethacrylate of a diglycidyl ether of a bisphenol which has been described is not essential, but it does enhance the hardness of the cured coating. Since the coatings of this invention are frequently used outdoors, as in molded parts employed on the exterior of automobiles, it is desired to limit the proportion of this component because excessive amounts lead to discoloration on exterior exposure. The preferred proportion of this component is from 3% to 7%.

It is also desirable to include up to about 10% of the polymerizable material of a $C_4$ to $C_8$ diol diacrylate, such as butane diol diacrylate or hexane diol diacrylate, in order to enhance flexibility without greatly impairing hardness and abrasion resistance, but this is not essential. Preferred proportions are from 1% to 6%, and the preferred diacrylate is 1,6-hexanediol diacrylate.

It is also important to obtain a cured coating which is strongly adherent to the plastic substrate, and ultraviolet cured liquid polyacrylates are usually poorly adherent to polycarbonate and plasticized polyvinyl chloride surfaces, especially when they are cured to form hard films. To overcome this inadequacy, this invention employs a carboxylic acid which contains acrylic unsaturation. Acrylic acid itself is particularly preferred, but carboxyl-functional $C_1-C_6$ alkylene esters and amides of acrylic acid are also contemplated. The esters are illustrated by beta-carboxyethyl acrylate. The amides are illustrated by epsilon carboxyhexyl acrylamide. The corresponding methacrylates and methacrylamides are also useful. It is thought that the acid-functional ultraviolet-cured product of this invention interacts with the basic plastic surface to provide the adhesion which is not normally obtained.

Another optional component which reduces surface tension without exuding from the coating to further increase abrasion resistance is a silicone dicarbinol diurethane diacrylate or dimethacrylate which is used in an amount of about 0.5% to 2.5% of the composition. These silicone-containing diacrylates are based on organic polysiloxanes having two substituents having a carbinol-terminal group. The carbinol group is provided by starting with a dihydroxy-terminated organic polysiloxane and alkoxylating it with ethylene oxide or propylene oxide so that the alkoxylate constitutes from 30% to 70% of the dicarbinol which is produced. The carbinol functionality so provided is reacted with an organic diisocyanate, such as 2,4-toluene diisocyanate or isophorone diisocyanate, and also with an hydroxy-functional acrylate, such as 2-hydroxyethyl acrylate or 2-hydroxypropyl acrylate, to provide a diacrylate-functional diurethane derivative of the organic polysiloxane dicarbinol.

The sequence of the above reactions is known to be variable, it being permissible to react the silicone dicarbinol with excess diisocyanate and then with the hydroxy acrylate, or to prereact the hydroxy acrylate with a molar proportion of the diisocyanate to form an unsaturated monoisocyanate which is reacted with the dicarbinol in a stoichiometric amount based on isocyanate and carbinol functionalities.

The usual organic polysiloxanes which are available in commerce are methyl or phenyl substituted (methyl substitution is preferred and will be used in the examples) and have a molecular weight in the range of 600 to 10,000. As is known, the valences of the silicon atoms in the polysiloxane carry inert organic substituents, such as methyl and/or phenyl substituents, except for the two hydroxy groups which are ethoxylated or propoxylated to provide the terminal carbinol groups. The initial polysiloxane can be dihydroxy terminated which is prereacted with a monoepoxide, such as propylene oxide or butylene oxide to provide terminal carbinol groups. These carbinol groups are then adducted with from 30% to 70%, preferably from 40% to 60%, of ethylene oxide to form the polyethoxylates utilized herein after conversion to a urethane acrylate. The usual commercial materials are polymethyl polysiloxane which have been ethoxylated to an about 50% ethylene oxide content and which have molecular weights of 2000 and 6000.

Isobornyl acrylate may also be present in small amount to enhance rapid radiation cure, flexibility, and to enhance the liquidity of the composition or one of its components.

The photoinitiators useful to enable ultraviolet cure are well known and will not be discussed at length. Acetophenone and benzophenone will illustrate the photoinitiators in this well known class. Substituted acetophenones are particularly effective, especially those which are hydroxy-substituted. A large number of substituted acetophenones are disclosed in U.S. Pat. Nos. 4,284,485 and 4,318,791. This invention will be exemplified using the commercial ketonic photoinitiator, Irgacure 184, which is the compound 1-hydroxycyclohexyl phenyl ketone. This compound is a substituted acetophenone. These substituted acetophenones are preferably used in combination with benzophenone to enable rapid and complete cure in an oxygen-containing atmosphere.

The invention is illustrated as follows:

Two coating formulations are provided by simply mixing together with warming to insure dissolution the components which are tabulated in the table which follows:

TABLE

|  | Example 1 | Example 2 |
|---|---|---|
| Epoxy diacrylate (1) | 6.0 | 6.0 |
| Trimethylol propane triacrylate (2) | 74.0 | 74.0 |
| 1,6-hexanediol diacrylate | 3.0 | 3.0 |
| Acrylic acid | 10.5 | — |
| Beta-carboxyethyl acrylate | — | 10.5 |
| Silicone acrylate oligomer (3) | 0.8 | 0.8 |
| Photoinitiator (4) | 4.48 | 4.48 |
| Stabilizer (5) | 0.02 | 0.02 |
| Benzophenone | 1.2 | 1.2 |

(1) Diglycidyl ether of bisphenol A having a molecular weight of 390 reacted with 2 molar proportions of acrylic acid.
(2) 2.8 acrylate groups per molecule.
(3) Dihydroxy-functional polymethyl polysiloxane polyethoxylated to 50% with ethylene oxide to have a molecular weight of 6000 (Dow Corning product Q4-3667 may be used) reacted with one molar proportion of isophorone diisocyanate and one molar proportion of 2-hydroxyethyl acrylate per hydroxy group to provide a silicone diurethane diacrylate.
(4) 1-hydroxycyclohexyl phenyl ketone.
(5) 2,6 di-tert-butyl-4-methyl phenol The above formulations are sprayed on polycarbonate and dioctyl phthalate-plasticized polyvinyl chloride moldings to provide wet coatings having a thickness of 0.5 mil. These are cured in air by an ultraviolet exposure of 2.0 Joule/cm2 and the result is hard, abrasion-resistant coatings which are strongly adherent to the plastic surfaces to which they have been applied. Variation of the coating thickness from 0.2 mil up to 0.8 mil was had while retaining good adhesion. Roll coat application on flat surfaces can also be used with these same formulations.

The terms polyacrylates and polymethacrylates are well known to identify a plurality of acrylic or methacrylic acid ester groups.

What is claimed is:

1. A radiation curable, liquid coating composition comprising from 70% to 85% of one or more polyacrylates or methacrylates containing at least 2.4 unsaturated groups per molecule, from 5% to 15% of a carboxylic acid which contains acrylic or methacrylic unsaturation, and at least one photoinitiator rendering the composition sensitive to ultraviolet light, said proportions being based on the total weight of polymerizable material.

2. A coating composition as recited in claim 1 in which said polyacrylate is trimethylol propane triacrylate.

3. A coating composition as recited in claim 1 in which said polyacrylate component includes from 1% to 12% of an epoxy diacrylate or dimethacrylate.

4. A coating composition as recited in claim 3 in which said epoxy diacrylate is a diacrylate of a diglycidyl ether of a bisphenol in which the molecular weight of the diglycidyl ether is less than about 600.

5. A coating composition as recited in claim 1 in which said composition includes 0.5% to 2.5% of a silicone dicarbinol diurethane diacrylate or dimethacrylate in which the carbinol groups are carried by an ethoxylate or propoxylate constituting from 30% to 70% of the silicone dicarbinol.

6. A coating composition as recited in claim 5 in which said silicone dicarbinol diurethane diacrylate is based on a methyl or phenyl-substituted polysiloxane ethoxylated to from 40% to 60% and having a molecular of from 600 to 10,000.

7. A coating composition as recited in claim 1 in which said photoinitiators are ketonic.

8. A coating composition as recited in claim 7 in which said ketonic photoinitiators comprise a substituted acetophenone.

9. A coating composition as recited in claim 8 in which said ketonic photoinitiator is 1-hydroxycyclohexyl phenyl ketone.

10. A coating composition as recited in claim 7 in which said photoinitiators further comprise benzophenone.

11. A coating composition as recited in claim 2 in which said trimethylol propane has been acrylated to provide an average of about 2.8 acrylate groups per molecule.

12. A coating composition as recited in claim 4 in which said diacrylate of a diglycidyl ether of a bisphenol is present in an amount of from 3% to 7%.

13. A coating composition as recited in claim 1 in which said composition further includes up to about 10% of the polymerizable material of a $C_4$ to $C_8$ diol diacrylate.

14. A coating composition as recited in claim 13 in which from 1% to 6%, of 1,6-hexanedioldiacrylate is employed.

15. A coating composition as recited in claim 1 in which said carboxylic acid containing acrylic unsaturation is a carboxyl-functional $C_1$-$C_6$ alkylene ester or amide of acrylic acid.

16. A coating composition as recited in claim 15 in which said carboxylic acid containing acrylic unsaturation is acrylic acid.

17. A plastic having a basic surface coated with an ultraviolet-cured adherent abrasion resistant coating of the coating composition recited in claim 1.

18. A coated plastic as recited in claim 17 in which said basic plastic surface is selected from polycarbonate and ester-plasticized polyvinyl chloride.

19. A radiation curable, liquid coating composition comprising from 70% to 85% of trimethylol propane triacrylate containing from 2.4 to 2.8 acrylate groups per molecule, from 1% to 12% of a diacrylate of a diglycidyl ether of a bisphenol in which the molecular weight of the diglycidyl ether is less than about 600, from 0.5% to 2.5% of a silicone dicarbinol diurethane diacrylate based on a methyl or phenyl-substituted polysiloxane which has been ethoxylated to from 40% to 60% and having a molecular of from 600 to 10,000, from 5% to 15% of acrylic acid, and at least one ketonic photoinitiator comprising a substituted acetophenone rendering the composition sensitive to ultraviolet light, said proportions being based on the total weight of polymerizable material.

20. A coating composition as recited in claim 19 further including from 1% to 6% of a $C_4$ to $C_8$ diol diacrylate.

* * * * *